(12) United States Patent
Wagner et al.

(10) Patent No.: US 6,453,352 B1
(45) Date of Patent: *Sep. 17, 2002

(54) INTEGRATED ELECTRONIC COMMERCE SYSTEM AND METHOD

(75) Inventors: Gary E. Wagner, Downingtown; Frank J. Kroboth, Exton, both of PA (US); Kenneth B. Lewis, Southfield, MI (US)

(73) Assignee: Electronic Data Systems Corporation, Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/892,580

(22) Filed: Jul. 14, 1997

(51) Int. Cl.$^7$ .......................... G06F 15/16; G06F 17/60
(52) U.S. Cl. ...................... 709/229; 709/203; 713/201; 705/44
(58) Field of Search .................. 709/225, 229, 709/203; 713/200–203, 164–167, 182–183; 705/18, 21, 39, 44, 73, 76

(56) References Cited

U.S. PATENT DOCUMENTS

| | | | | |
|---|---|---|---|---|
| 4,780,821 A | * | 10/1988 | Crossley | 709/1 |
| 5,138,712 A | * | 8/1992 | Corbin | 713/200 |
| 5,434,918 A | * | 7/1995 | Kung et al. | 380/25 |
| 5,548,645 A | * | 8/1996 | Ananda | 705/52 |
| 5,579,222 A | * | 11/1996 | Bains et al. | 717/11 |
| 5,586,260 A | * | 12/1996 | Hu | 709/229 |
| 5,604,807 A | * | 2/1997 | Yamaguchi et al. | 380/259 |
| 5,608,874 A | * | 3/1997 | Ogawa et al. | 709/246 |
| 5,684,951 A | * | 11/1997 | Goldman et al. | 713/202 |
| 5,721,779 A | * | 2/1998 | Funk | 380/23 |
| 5,732,137 A | * | 3/1998 | Aziz | 380/25 |
| 5,748,890 A | * | 5/1998 | Goldberg et al. | 713/200 |
| 5,764,890 A | * | 6/1998 | Glasser et al. | 713/202 |
| 5,784,463 A | * | 7/1998 | Chen et al. | 380/21 |

(List continued on next page.)

FOREIGN PATENT DOCUMENTS

| | | | |
|---|---|---|---|
| EP | 0 822 535 A2 | 2/1998 | G09F/27/00 |
| WO | WO 97/16793 | 5/1997 | G06F/17/00 |
| WO | WO 97/18515 | 5/1997 | G06F/13/00 |

OTHER PUBLICATIONS

Microsoft Computer Dictionary, 2nd ed., Microsoft Press, p. 222, 1996.*

Gralla, P., How Intranets Work, Ziff–Davis Press, pp. 44–45, Nov. 1996.*

Gralla, P., How Intranets Work, Ziff–Davis Press, pp. 75–77, Nov. 1996.*

Article, Bruce Caldwell, Industry Taps into Web Power, *Informationweek*, May 6, 1996, 1 p.

Article, Geoffrey James, Intranets Rescue reengineering, *Datamation*, Dec. 1996, pp. 38–42 and 44–45.

Primary Examiner—Zarni Maung
Assistant Examiner—Andrew Caldwell
(74) Attorney, Agent, or Firm—Baker Botts L.L.P.

(57) ABSTRACT

An integrated electronic commerce system (10) may include a server system (12) comprising a plurality of electronic commerce applications (44) and a server security system (46). The electronic commerce applications (44) may comprise an electronic mail application (52), a web server application (54), and a file transfer application (56). The server security system (46) may validate a client system (14) and download information operable to enable a service manager (90) of the client system (14) to invoke the electronic mail application (52), the web server application (54), and the file transfer application (56) to send and receive data over a network (18).

25 Claims, 5 Drawing Sheets

U.S. PATENT DOCUMENTS

| | | | |
|---|---|---|---|
| 5,794,206 A | * 8/1998 | Wilkinson et al. | 705/1 |
| 5,794,234 A | 8/1998 | Church et al. | 707/4 |
| 5,845,070 A | * 12/1998 | Ikudome | 380/25 |
| 5,850,442 A | * 12/1998 | Muftic | 380/21 |
| 5,859,969 A | * 1/1999 | Oki et al. | 709/200 |
| 5,864,871 A | * 1/1999 | Kitain et al. | 707/104 |
| 5,875,296 A | * 2/1999 | Shi et al. | 713/202 |
| 5,889,942 A | * 3/1999 | Orenshteyn | 713/201 |
| 5,893,076 A | * 4/1999 | Hafner et al. | 705/28 |
| 5,907,621 A | * 5/1999 | Bachman et al. | 713/155 |
| 5,930,772 A | * 7/1999 | Gomyo et al. | 705/30 |
| 5,940,504 A | * 8/1999 | Griswold | 705/59 |
| 5,950,173 A | * 9/1999 | Perkowski | 705/26 |
| 6,006,199 A | * 12/1999 | Berlin et al. | 705/26 |
| 6,006,333 A | * 12/1999 | Nielsen | 713/202 |
| 6,085,324 A | * 7/2000 | Ogram | 713/202 |
| 6,088,805 A | * 7/2000 | Davis et al. | 713/202 |
| 6,092,198 A | * 7/2000 | Lanzy et al. | 713/201 |
| 6,182,076 B1 | * 1/2001 | Yu et al. | 707/10 |

\* cited by examiner

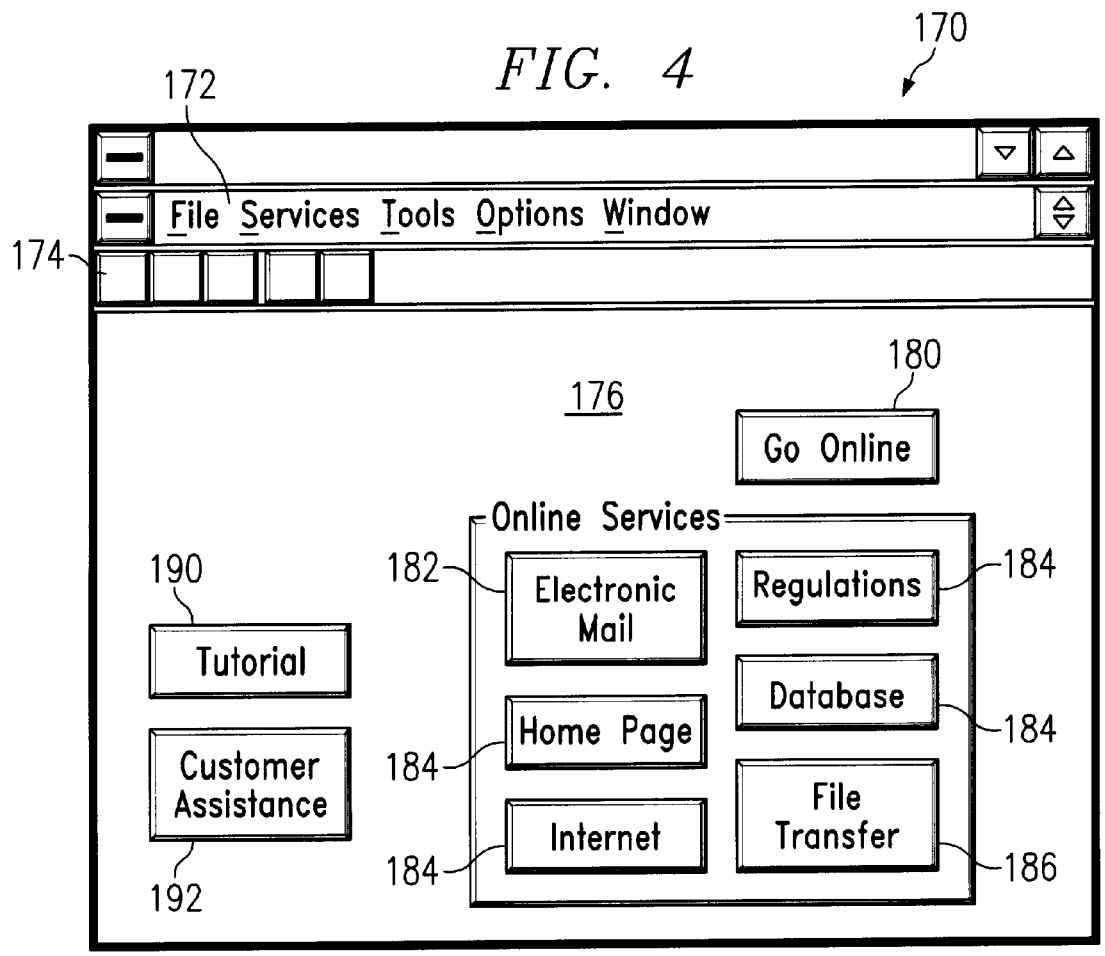

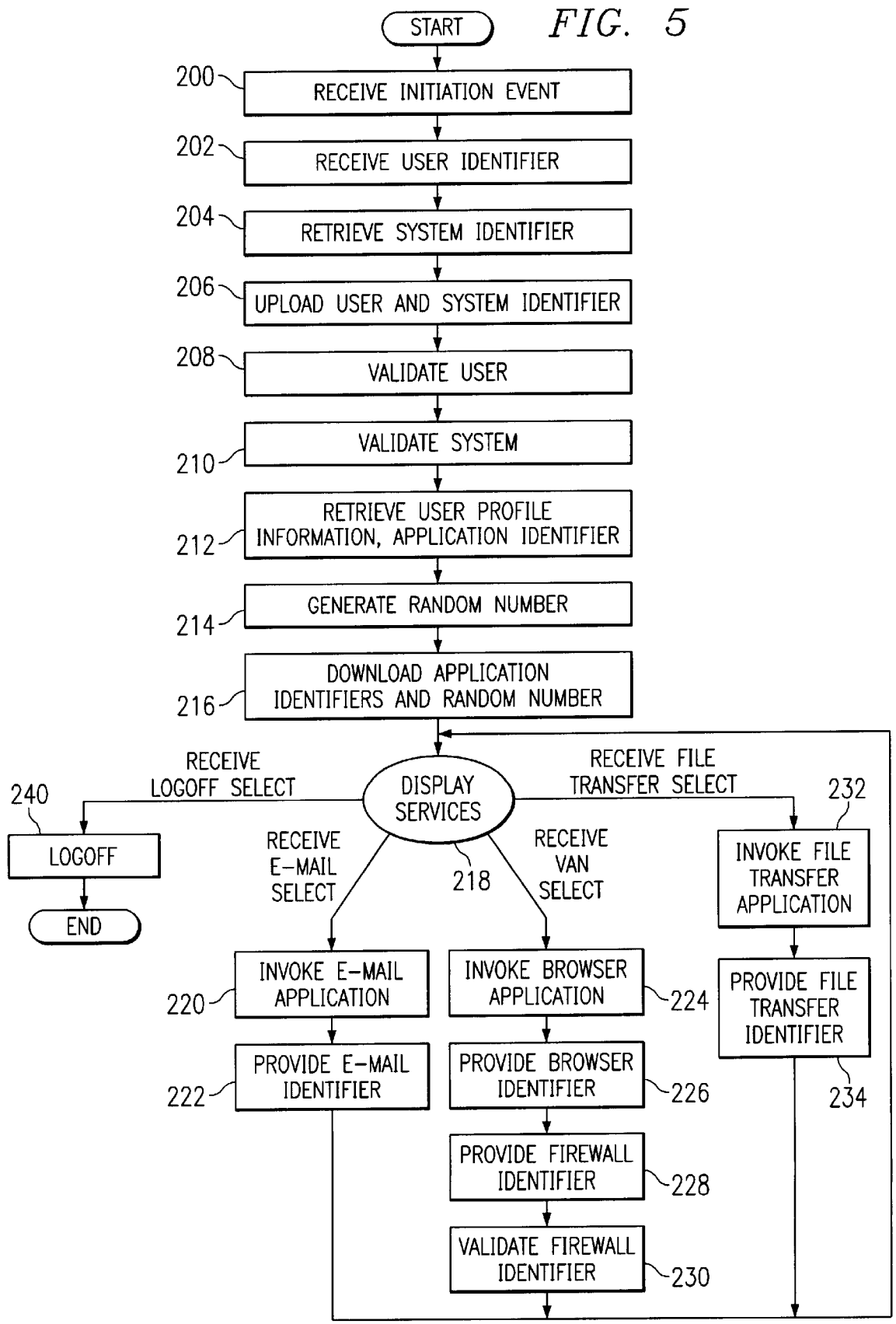

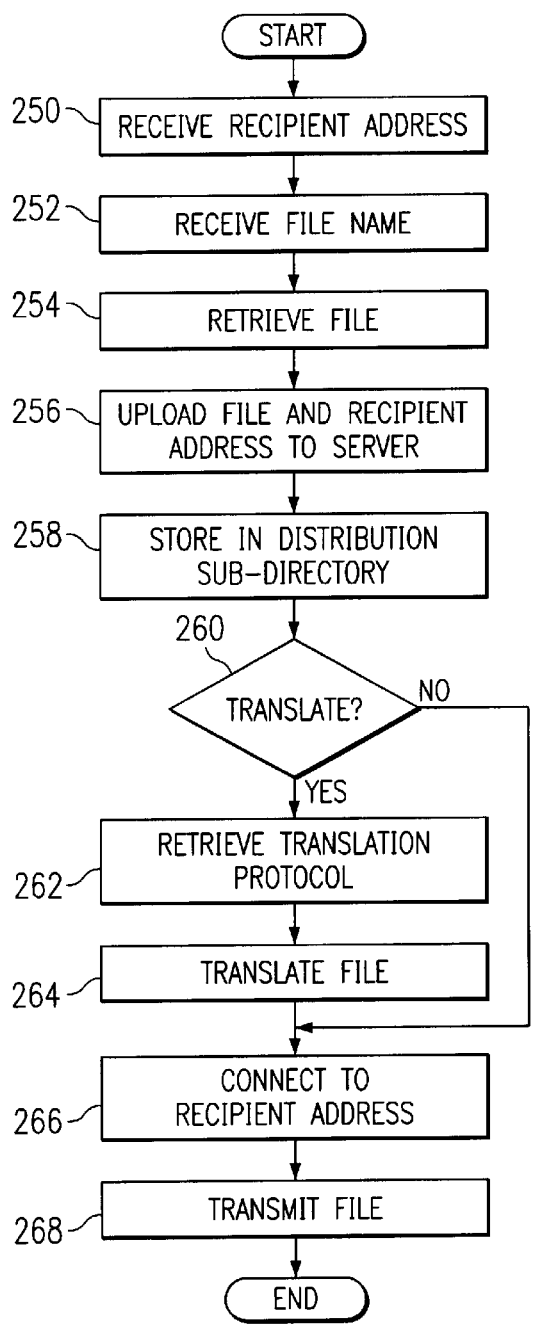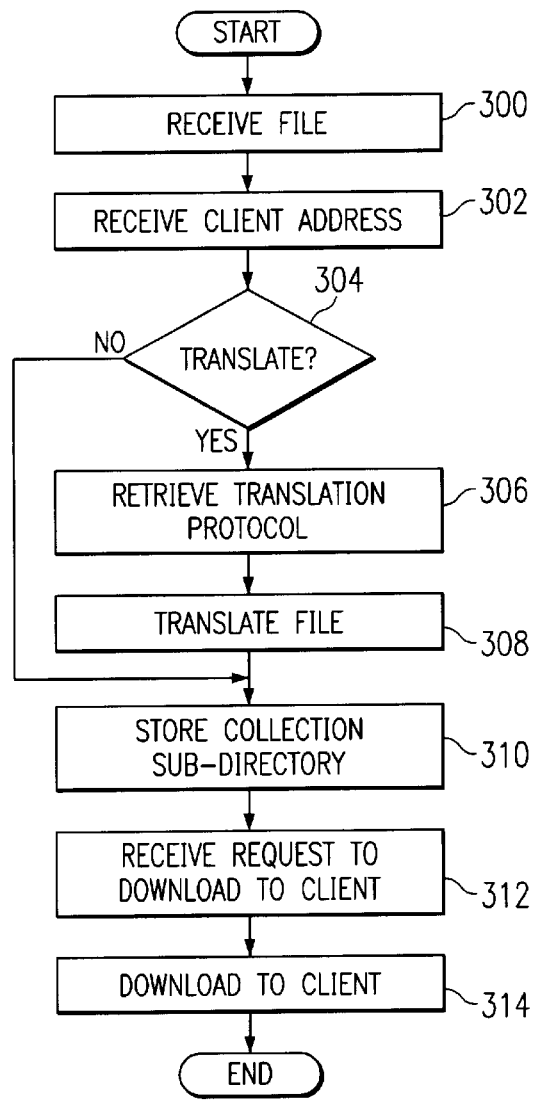

INTEGRATED ELECTRONIC COMMERCE SYSTEM AND METHOD

TECHNICAL FIELD OF THE INVENTION

This invention relates generally to the field of electronic commerce, and more particularly to an integrated electronic commerce system and method.

BACKGROUND OF THE INVENTION

Electronic commerce (EC) is a way to electronically conduct and manage business transactions using computer and telecommunications networks. It provides participants with efficient methods of working with customers, suppliers, and other trading partners. Network-based electronic commerce may include simple transactions, such as electronic mail and facsimiles, and more complicated transactions, such as electronic data interchange (EDI), electronic funds transfer (EFT), and shared network resources. Electronic data interchange and electronic funds transfer transactions create opportunities for companies to shorten procurement cycles and to cut costs on inventory and manufacture parts through the use of just-in-time (JIT) and quick response (QR) practices. Shared network resources allow companies to accelerate time-to-market cycles through collaborative development and product customization.

Resources to support complicated electronic commerce services such as electronic data interchange, electronic funds transfer, and shared resources are expensive. Additionally, the resources are often segregated into specialized systems. As a result, access to complicated electronic commerce services has traditionally been limited to larger business. The lack of smaller business participation in such services reduces the efficiency of the smaller business and the value of the services to the larger business.

SUMMARY OF THE INVENTION

Accordingly, a need has arisen in the art for improved electronic commerce services. The present invention provides an integrated electronic commerce system and method that substantially reduce or eliminate disadvantages and problems associated with prior systems.

In accordance with the present invention, an integrated electronic commerce system may include a server system comprising a plurality of electronic commerce applications and a server security system. The electronic commerce applications may include an electronic mail application, a web server application, and a file transfer application. The server security system may validate a client system and download information operable to enable a service manager of the client system to invoke the electronic mail application, the web server application, and the file transfer application to send and receive data over a network.

More specifically, in accordance with one embodiment of the present invention, the information downloaded to the client system may comprise an electronic mail identifier, a file transfer identifier, and a browser identifier. The electronic mail identifier may enable the service manager of the client system to invoke the electronic mail application. Similarly, the file transfer identifier may enable the service manager to invoke the file transfer application. The file transfer application may send and receive electronic data interchange (EDI) data, electronic funds transfer (EFT) data, and the like over the network.

The browser identifier may enable the service manager to invoke the web server application. The web server application may send and receive data over public and private networks. Public networks may include the Internet. Private networks may include value added networks (VAN) such as an intranet or an extranet.

Technical advantages of the present invention include providing an integrated electronic commerce system. In particular, the client may access a plurality of electronic commerce systems from an integrated service manager. This allows clients to electronically conduct business from a simple interface having a single point of entry.

Another technical advantage of the present invention includes providing relatively low cost electronic commerce services. In particular, the client may access electronic commerce services through a server system. The server system may include an electronic mail application, a web server application, and a file transfer application. Accordingly, the client may efficiently and inexpensively send and receive data over a network. The data may include electronic data interchange (EDI), electronic funds transfer (EFT), and the like.

Other technical advantages will be readily apparent to one skilled in the art from the following figures, descriptions, and claims.

BRIEF DESCRIPTION OF THE DRAWINGS

For a more complete understanding of the present invention and its advantages thereof, reference is now made to the following brief description, taken in conjunction with the accompanied drawings and detailed description, where like reference numerals represent like parts, in which:

FIG. 4 illustrates a graphical user interface (GUI) window for conducting electronic commerce in accordance with one embodiment of the present invention;

FIG. 5 is a flow diagram illustrating a method of providing integrated electronic commerce services over a network in accordance with one embodiment of the present invention;

FIG. 6 is a flow diagram illustrating a method of uploading and transmitting a client file over a network in accordance with one embodiment of the present invention; and FIG. 7 is a flow diagram illustrating a method of receiving and downloading a data file to a client in accordance with one embodiment of the present invention.

DETAILED DESCRIPTION OF THE INVENTION

The preferred embodiments of the present invention and its advantages are best understood by referring now in more detail to FIGS. 1–7 of the drawings, in which like numerals refer to like parts throughout the several views. FIGS. 1–7 illustrate a system and method of providing electronic commerce over a network. As described in more detail below, the system and method employ a client system having an integrated service manager operable to open and use electronic commerce applications of a server system to transmit electronic commerce over a series of networks. Electronic commerce applications may include electronic mail, a file transfer system, and a browser. It will be understood that electronic commerce applications may comprise other applications in that the electronic mail, file transfer and web server applications are for illustrative purposes only. Accordingly, the present invention allows electronic commerce to be conducted from a single point of entry.

Figure 1:
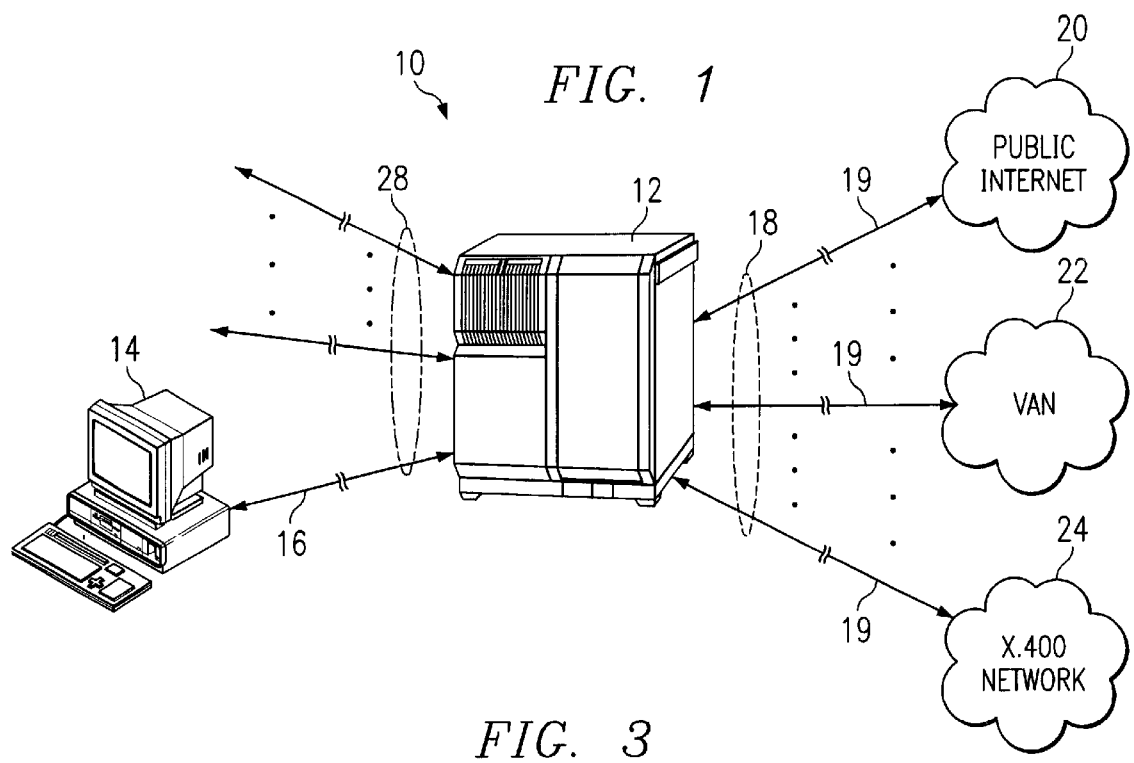
FIG. 1 is a schematic diagram illustrating a client system and a server system connected via a network in accordance with one embodiment of the present invention.

FIG. 1 illustrates an integrated electronic commerce system 10 in accordance with one embodiment of the present invention. The integrated electronic commerce system 10 may comprise a server system 12 connected to a client system 14 by a dedicated network 16. The server system 12 may be a computer such as a personal computer, file server, workstation, minicomputer, mainframe or any other computer capable of communicating and interconnecting with other computers. As described in more detail below, the server system 12 may include an input/output system, processor, and memory. The input/output system may connect the dedicated network 16 and other input and output devices to the server system 12. The dedicated network 16 may be directly connected to the server system 12 or may be connected through a data transmission device such as a modem or the like. In one embodiment, the dedicated network 16 may comprise a modem connected to the client system 14 and a modem link to the server system 12 via an access server connected to an internal wide area network to which the server system 12 is connected. The input devices may include a pointing device such as a mouse or trackpad, a keyboard, or the like. The output devices may include a monitor, a printer, or the like.

The server system 12 may be connected to a plurality of networks 18. As described in more detail below, electronic commerce may be conducted over the networks 18. In one embodiment, the networks 18 may include a public Internet 20, one or more value added networks 22, and an X.400 electronic mail network. It will be understood that other or different networks 18 may be connected to the server system 12 within the scope of the present invention.

Each network 18 may comprise a plurality of communication lines 19. Communication lines 19 may be any type of communication link capable of supporting data transfer. In one embodiment, the communication lines 19 may include any combination of an Integrated Services Digital Network (ISDN) communication line, a hardwire line, or a telephone link. It will be understood that the communication lines 19 may comprise other types of links within the scope of the present invention.

The client system 14 may be similar to the server system 12 and may be implemented using virtually any-type of computer. As described in more detail below, the client system 12 is preferably a personal computer having an input/output system, a processor, and a memory. As previously described for the server system 12, the input/output system may connect the dedicated network 16 and other input and output devices to the client system 14.

The dedicated network 16 may include a plurality of communication lines 28 between the server system 12 and a plurality of clients such as the client system 14. The communication lines 28 may also connect to intermediate servers between the server system 12 and the client system 14. Thus, a plurality of intermediate servers may be disposed between the client system 14 and the server system 12 along communication lines 28.

Communication lines 28 may be any type of communication link capable of supporting data transfer. In one embodiment, the communication lines 28 may include any combination of an Integrated Services Digital Network (ISDN) communication line, a hardwire line, or a telephone link. It will be understood that the communication lines 28 may comprise other types of links within the scope of the present invention.

In one embodiment, the dedicated network 16 may comprise dial access via a telephone link. In this embodiment, the server system 12 may be remote from the client system 14 and located anywhere in the world. Generally described, the client system 14 may connect and communicate with the server system 12 via a modem. Dial access may be through a 1-800 telephone number. Preferably, the modem has a data transmission rate of at least 9.6–28.8 kilobytes (Kb). It will be understood that a modem may have other transmission rates and that access may be otherwise obtained within the scope of the present invention. Moreover, although the dedicated network 16 is illustrated and described in FIG. 1 as dial access via a telephone link, the dedicated network 16 may be any interconnection found on any computer network such as a local area network (LAN), a wide area network (WAN), or any other communications and data exchange systems created by connecting two or more computers.

Figure 2:
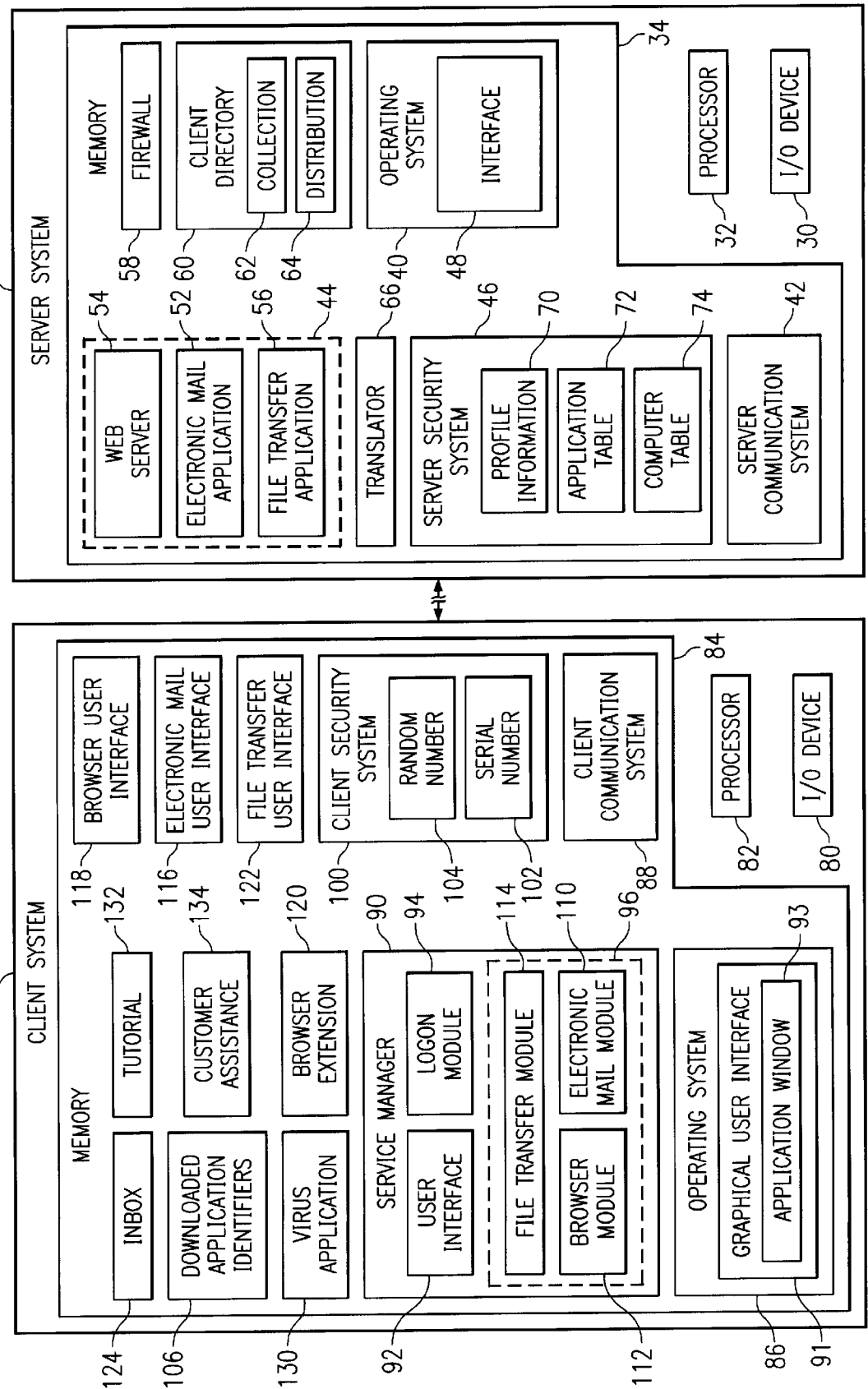
FIG. 2 is a schematic block diagram illustrating components of the client and server systems of FIG. 1 in accordance with one embodiment of the present invention.

FIG. 2 illustrates a block diagram of the server system 12 and client system 14 in accordance with one embodiment of the present invention. The server system 12 may comprise an input/output system 30, a processor 32 and memory 34. As previously described, the input/output system 30 may connect the dedicated network 16 and other input and output devices to the server system 12. The dedicated network 16 may be directly connected to the server system 12 or may be connected through a data transmission device such as a modem or the like. Input devices may include a pointing device such as a mouse or trackpad, a keyboard, and the like. Output devices may include a monitor, a printer, and the like.

The server system 12 includes computer software that may be loaded into the memory 34 and executed by the processor 32. The computer software may generally be identified by modules and similar systems in memory 34. It will be understood that the computer software may be otherwise combined and/or divided for processing within the scope of the present invention. Accordingly, the labels of the modules and other software systems are for illustrative purposes and may be varied within the scope of the present invention.

The computer software may be loaded into memory 34 from disk storage (not shown). Disk storage may include a variety of types of storage media. For example, disk storage may include floppy disk drives, hard disk drives, CD/ROM drives, or magnetic tape drives.

Memory 34 may include an operating system 40, a server communication system 42, a set of electronic commerce applications 44, and a server security system 46. The operating system 40 may include a standard UNIX interface 48. The operating system 40 may be UNIX, NVS, or the like.

The server communication system 42 may, in conjunction with a counterpart on the client system 14, provide a communication infrastructure for the integrated electronic commerce system 10. In one embodiment, the server communication system 42 may comprise TCP/IP which is the primary communications protocol for a UNIX server platform. It will be understood that the server communication system 42 may comprise other communication formats within the scope of the present invention.

In one embodiment, the electronic commerce applications 44 may comprise an electronic mail application 52, a web server application 54, and a file transfer application 56. It will be understood that the server system 12 may comprise other electronic commerce applications 44 within the scope of the present invention.

The electronic mail application 52 may send and receive messages over the networks 18. In one embodiment, the electronic mail application 52 may comprise HP OPEN-MAIL SERVER by Hewlett-Packard Company. In this embodiment, the electronic mail application 52 may send or receive messages over the X.400 electronic mail network 24 (FIG. 1). It will be understood that the server system 12 may comprise other electronic mail applications 52 within the scope of the present invention.

The web server application 54 may connect to and browse the networks 18. The web server application 54 may send and receive data over a public network, an intranet, an extranet, and the like. The web server application 54 may also access a shared resource, a value added network (VAN) and the like over a network. In one embodiment, the browser 54 may comprise NETSCAPE COMMERCE SERVER by Netscape Communication Corporation. It will be understood that the web server application 54 may comprise other browsers capable of connecting and browsing networks 18 within the scope of the present invention.

The web server application 54 may access the networks 18 through a fire wall 58. In one embodiment, access to public networks such as the public Internet 20 may be routed through the fire wall 58. It will be understood that access to other networks may be routed through the fire wall 58 within the scope of the present invention.

The file transfer application 56 may transmit and receive data files over the networks 18. The file transfer application 56 may collect and distribute data files from a client directory 60. The client directory 60 may comprise a collection sub-directory 62 and a distribution sub-directory 64. Files downloaded from the networks 18 may be held in the collection sub-directory 62 prior to being downloaded to the client system 14. Files uploaded from the client system 14 may be held in the distribution sub-directory 64 prior to transmission over the networks 18. It will be understood that data files may be otherwise stored or transmitted "on-the-fly" (in real time or near real time) by the server system 14 within the scope of the present invention.

The file transfer application 56 may download data files from the collection sub-directory 62 to the client system 14 upon a request by the client. As described in more detail below, the request may be automatic upon a client logon to the server system 12 or other type of event.

The file transfer application may periodically scan the distribution sub-directory 64 for data files to be transmitted over the networks 18. In one embodiment, the file transfer application 56 may scan the distribution sub-directory 64 every fifteen (15) minutes. It will be understood that the file transfer application 56 may otherwise scan the distribution sub-directory 64 within the scope of the present invention.

The file transfer application 56 may call a translator 66 to translate data files received or to be transmitted over the networks 18. The translator 66 may translate preset types of data files between identified trading partners. The data files may be translated to be compatible with the recipient system. In one embodiment, data files received from the networks 18 may be translated on the fly prior to being stored in the collection sub-directory 62. Similarly, data files uploaded from the client system 14 may be stored in the distribution-sub-directory 64 and later translated if necessary prior to being delivered to a trading partner. It will be understood that data files may be otherwise translated in the scope of the present invention.

The server security system 46 may provide validation of the client system 14. In one embodiment, the server security system 46 may validate a user identifier and a system identifier of the client system 14. As described in more detail below, the user identifier may be a combination of a user ID and password. The system identifier may be a combination of a software serial number and a random number previously generated and downloaded by the server security system 46. The random number in conjunction with the serial number prevents the software of the client system 14 from being copied and used on another system.

The server security system 46 may comprise a profile information table 70, an application table 72 and a computer table 74. The profile information table 70 may store user preferences. The preferences may include automatic downloads, automatic logoffs, and the like. It will be understood that other client preferences may be stored in profile information table 70. It will be further understood that the server security system 46 may comprise other or different information tables in the scope of the present invention.

The application table 72 may comprise application identifiers for each client system. The application identifiers may be downloaded by the server security system 46 to the client system 14 upon validation. The application identifiers enable the client system 14 to access the electronic mail application 52, the web server application 54, and the file transfer application 56 to conduct electronic commerce over the networks 18. In one embodiment, the application identifiers may include an ID and password for each electronic commerce application. It will be understood that the application identifiers may comprise other fields within the scope of the present invention.

The server security system 46 may periodically update the application identifiers to prevent unauthorized access to the applications. In one embodiment, the application identifiers may be updated every thirty (30) days. It will be understood that the identifiers may be otherwise updated within the scope of the present invention.

The computer table 74 may comprise a serial number of the software of each client system 14. The last random number downloaded to a client system 14 may also be stored in the computer table 74. The serial and random numbers may be compared to serial and random numbers provided by the client system 14 for system validation. If the numbers match, the system is valid. If the numbers do not match, the system is not-valid and access to the server system 12 may be denied.

In one embodiment, the server security system 46 may comprise PERL scripts and MICROSOFT VISUAL C++ version 1.5. It will be understood that the server security system 46 may comprise other programming formats within the scope of the present invention.

The client system 14 may comprise an input/output system 80, a processor 82 and memory 84. As previously described in connection with the input/output system 30, the input/output system 80 may connect the dedicated network 16 and other input and output devices to the client system 14. The dedicated network 16 may be directly connected to the client system 14 or may be connected through a data transmission device such as a modem or the like. Input devices may include a pointing device such as a mouse or trackpad, a keyboard, and the like. Output devices may include a monitor, a printer, and the like.

The client system 14 includes computer software that may be loaded and/or downloaded into memory 84 and executed by the processor 82. The computer software may generally be identified by modules and similar systems in memory 84. It will be understood that the computer software may be otherwise combined and/or divided for processing within the scope of the present invention. Accordingly, the labels of the modules and other software systems are for illustrative purposes and may be varied within the scope of the present invention.

As previously described in connection with memory 34, computer software may be loaded into memory 84 from disk storage (not shown). Disks storage may include a variety of types of storage media. For example, disk storage may include floppy disk drives, hard disk drives, CD/ROM drives, or magnetic tape drives.

Memory 84 may include an operating system 86, a client communication system 88 and an integrated service manager 90. The operating system 86 may include a graphical user interface (GUI) 91 capable of generating a plurality of application windows 93. The operating system 86 may be MacIntosh OS, WINDOWS NT, WINDOWS 95, OS/2, or any other operating system capable of providing. or operating in conjunction with a graphical user interface (GUI).

The client communication system 88 may operate in conjunction with the server communication system 42 to provide a communication infrastructure between the client system 14 and the server system 12. As previously discussed in connection with the server communication system 42, the client communication system 88 may comprise TCP/IP for Windows, SDK-Visual Edition, part number: TCP/107S version 4.0. It will be understood that the client communication system 88 may comprise other communication formats compatible with the server communication system 42 within the scope of the present invention.

The integrated service manager 90 may comprise a user interface 92 for interacting with a client. As described in more detail below in connection with FIG. 4, the user interface 92 may comprise icons associated with modules of the service manager 90. Modules may include a logon module 94 and a set of electronic commerce modules 96. Thus, the client may click on icons to logon to the server system 12 and to conduct electronic commerce transactions via the server system 12. Accordingly, the client may conduct all of its electronic commerce transactions from a single interface. As a result, a client need not locate and launch a number of separate applications, which can be time-consuming and confusing to an unsophisticated small business client.

The logon module 94 may invoke a client security system 100 to logon to the server system 12. The client security system 100 may operate in conjunction with the server security system 46 to validate the client system 14. In one embodiment, the client security system 100 may request a user identifier from the client. The user identifier may be a user identifier (ID) and a password. The client security system 100 may pass the user identifier to the server security system 46 for validation. The client security system 100 may also pass a system identifier to the server security system 46 for validation. In one embodiment, the system identifier may comprise a serial number 102 and a random number 104 of the client system software. A new random number is generated and downloaded by the server security system 46 with each validation.

Upon validation of the client system 14, the client security system 100 may receive application identifiers 106 from the server security system 46. The application identifiers 106 enable the integrated service manager 90 to access the electronic mail application 52, the web server application 54, and the file transfer application 56 on the server system 12. In one embodiment, the application identifiers may comprise an ID and password for each application. As previously described in connection with the server security system 46, the IDs and passwords may be periodically updated by the server security system 46 to lessen or prevent unauthorized use of the applications 44.

The electronic commerce modules 96 may include a module for each electronic commerce application 44 of the server system 12. In one embodiment, the modules 96 may comprise an electronic mail module 110, a browser module 112, and a file transfer module 114. It will be understood that the electronic commerce modules 96 may comprise other modules within the scope of the present invention.

The electronic mail module 110 may be launched by an electronic mail icon (FIG. 4) of the user interface 92 of the service manager 90. Upon activation, the electronic mail module 110 may open an electronic mail user interface 116 to access the electronic mail application 52. Thereafter, the client may interact directly with the application through the application interface 116.

The browser module 112 may be launched by a browser icon (FIG. 4) of the user interface 92 of the service manager 90. Upon activation, the browser module 112 may open a browser user interface 118 to access the web server application 54. Thereafter, the client may interact directly with the web server application 54 through the application interface 118.

A browser extension 120 may be provided on the client system 14 for reading specific types of Web pages. In one embodiment, the browser extension 120 may comprise ACROBAT READER version 2.1 by Adobe Systems Inc., which provides cross-platform capabilities. It will be understood that other or no browser extensions 120 may be provided within the scope of the present invention.

The file transfer module 114 may be launched by a file transfer icon (FIG. 4) of the user interface 92 of the service manager 90. Upon the activation, the file transfer module 114 may open a file transfer user interface 122 to access the file transfer application 56. Thereafter, the client may interact directly with the file transfer application 56 through the application interface 122.

The file transfer application 56 may download files to an inbox 124 of the client system 14. The inbox 124 prevents pre-existing files and data of the client system 14 from being overwritten by the file transfer application 56 during file download. In one embodiment, the inbox 124 may be a dedicated directory. It will be understood that the inbox 124 may be otherwise configured within the scope of the present invention.

In one embodiment, the service manager 90 may comprise MICROSOFT VISUAL BASIC version 3.0. In this embodiment, the user interface 92, logon module 94 and electronic commerce modules 96 may also comprise MICROSOFT VISUAL BASIC version 3.0. It will be understood that the integrated service manager 90, user interface 92 and modules 94 and 96 may comprise other programming formats and remain within in the scope of the present invention.

A virus protection application 130 may also be provided in memory. The virus protection application 130 may be operated by the client system 14 to scan downloaded data for harmful viruses and the like. In one embodiment, the virus protection application 130 may comprise F-PROT PROFESSIONAL version 2.22.2 for DOS/Wind3.X/Win95 by Command Software Systems. In this embodiment, the virus protection application 130 may be set to selectively or continually monitor the client system 14. It will be understood that other or no virus protection applications may be used and remain within the scope of the present invention.

The client system 14 may include a tutorial 132 in memory 84. The tutorial may provide information to the client on how to operate the integrated service manager 90. The tutorial 132 may be accessed through the integrated service manager 90. In one embodiment, the tutorial 132 may be accessed through an icon (FIG. 4) of the user interface 92 of the service manager 90. The tutorial 132 may be programmed using XVT DEVELOPMENT SOLUTIONS FOR C by XVT Software, Inc. It will be understood that the tutorial 132 may be otherwise programmed or accessed within the scope of the present invention.

The client system 14 may also provide a customer assistance module 134 for the client. Customer assistance may allow the client to quickly and easily obtain help for configuring and using the integrated electronic commerce system 10. In one embodiment, the customer assistance module 134 may be accessed through an icon (FIG. 4) of the user interface 92 of the service manager 90.

Figure 3:
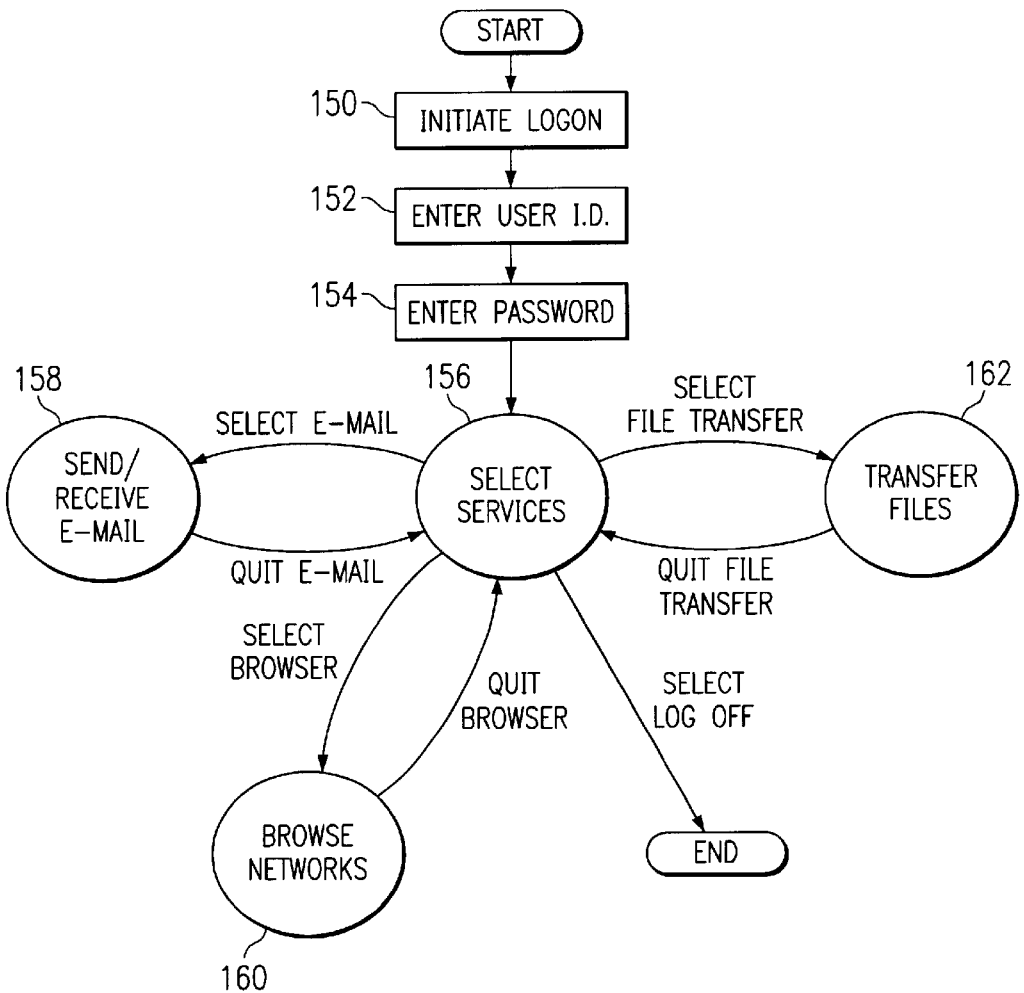
FIG. 3 is a flow diagram from a client's perspective illustrating the process of conducting electronic commerce in accordance with one embodiment of the present invention.

FIG. 3 illustrates a flow diagram by which a client may conduct electronic commerce in accordance with one embodiment of the present invention. The process begins at step 150 in which a client may initiate logon to the server system 12. As previously described, the client may initiate logon by clicking on a logon icon of the user interface 92 of the service manager 90. In response, as described in more detail below, the client security system 100 may display a dialog box to the client requesting a user identifier from the client. The user identifier may comprise a user ID and a password.

Proceeding to step 152, the client may enter a user ID. At step 154, the client may enter a password. The client security system 100 may then pass the user ID and password to the server system 12 for validation. Upon validation, the client system 14 may display the user interface 92 of the service manager 90.

Referring to FIG. 4, the user interface 92 may comprise an application window 170. Application window 170 may comprise drop down menus 172, toolbar 174 and a plurality of icons 176 for selecting electronic commerce services. For the embodiment of FIG. 4, the window 170 may comprise a logon icon 180, an electronic mail icon 182, a plurality of browser icons 184, and a file transfer icon 186. The logon icon 180 may be associated with the logon module 94 of the service manager 90. The electronic mail icon 182 may be associated with the electronic mail module 110 of the service manager 90. The browser icons 184 may be associated with the browser module 112 of the service manager 90. Several browser icons 184 may be provided to divide browser services into specific network services. For example, Internet access may have a separate icon from intranet access. Further, intranet access may be divided into specific value added networks (VAN) such as online regulations, regulatory rulings and the like, databases, and a particular company's intranet. It will be understood that the browser icons 184 may be otherwise divided within the scope of the present invention. The file transfer icon 186 may be associated with the file transfer module 114 of the service manager 90.

The application window 170 may include additional icons within the scope of the present invention. For example, the application window 170 may include a tutorial icon 190 and a customer assistance icon 192. The tutorial icon 190 may be associated with the tutorial 132. Similarly, the customer assistance icon 192 may be associated with customer assistance 134. It will be understood that fewer or different icons may be provided in the user interface 92 of the service manager 90.

Returning to FIG. 3, the client may select electronic mail services from the application window 170 displayed at state 156. As previously described, the client may select electronic mail by clicking on the electronic mail icon 182. The electronic mail selection branch of state 156 leads to state 158. At state 158, the client may send, receive and/or check electronic mail messages. After the client has finished, the quit electronic mail branch of state 158 may return to state 156.

The client may also select browser services from the application window 170 displayed at state 156. As previously described, the client may select the browser by clicking on one of the browser icons 184. The browser selection branch of state 156 leads to state 160. At state 160, the client may browse the selected network 18. As previously described, the network may be a value added network (VAN), an intranet, extranet, Internet, and the like. After the client has finished browsing the selected network 18, the quit browser branch of state 160 may return to state 156.

The client may further select file transfer services from the application window 170 displayed at state 156. As previously described, the client may select file transfer services by clicking on the file transfer icon 186. The file transfer selection branch of state 156 leads to state 162. At state 162, the client may transmit and receive data files over the networks 18. As previously described, the data files may include electronic data interchange (EDI), electronic funds transfer (EFT), and the like. After the client has finished transferring funds, the quit file transfer branch of state 162 may return to state 156.

Accordingly, the client may access a wide variety of electronic commerce services from a single interface. As a result, smaller and non-sophisticated businesses may participate in electronic commerce services. Such participation improves the efficiency of the smaller businesses and of larger businesses that may now electronically trade with the smaller businesses.

After the client has finished its electronic commerce transactions, the client may logoff the server system 12. The logoff selection branch of state 156 leads to the end of the process.

FIG. 5 illustrates a flow diagram of a method of providing electronic commerce services in accordance with one embodiment of the present invention. The process begins at step 200 in which the client system 14 may receive an initiation event. As previously described, the initiation event may be a client clicking on the logon icon 180 of the user interface 92 of the service manager.

Proceeding to step 202, the client security system 100 may receive a user identifier. As previously described, the user identifier may be received from the client in response to a request by the client security system. 100. The user identifier may comprise a user ID and a password. At step 204, the client security system 100 may retrieve a system identifier. The system identifier may be a serial number 102 and a random number 104 of the client system software. Proceeding to step 206, the client security system 100 may upload the user and system identifiers to the server system 12. Communication between the client system 14 and the server system 12 may be carried out by the server and client communication systems 42 and 88.

Next, at step 208, the server security system 46 may validate the user identifier. As previously described, the user identifier is valid if the user ID and password matches that stored in the server system 12. At step 210, the server security system 46 may validate the system identifier. The system identifier is valid if the serial and random numbers 102 and 104 of the software matches that stored in the server system 12. If the user identifier and/or the system identifier is invalid, access to the server system 12 may be denied.

Proceeding to step 212, upon validation the server security system 46 may retrieve profile information and application identifiers associated with the client system 14. The profile information may be retrieved from the profile information table 70. The application identifiers may be retrieved from the application table 72. As previously described, the application identifiers may comprise an ID and password for each electronic commerce application of the system 10.

At step 214, the server security system 46 may generate a random number to be used for validation the next time the client attempts to logon to the server system 12.

The random number is a safeguard to prevent unauthorized copying and use of the client system software. Next, at step 216, the application identifiers and the random number may be downloaded to the client system 14. The application identifiers enable the client system 14 to access the electronic commerce applications of the server system 12. Accordingly, the electronic commerce system 10 provides a single point of entry for the client to electronic commerce systems. As a result, the client need only remember a single user identifier rather than identifiers for several different electronic commerce applications.

Step 216 leads to state 218. At state 218, the service manager 90 may display the user interface 92. As previously described, the user interface 92 may be the application window 170 described in connection with FIG. 4. In response to receipt of an electronic mail selection at state 218, the electronic mail branch of state 218 may lead to step 220. At step 220, the electronic mail application 52 may be invoked. Next, at step 222, the electronic mail identifier may be provided to the electronic mail application 52 to enable access to the application. After the application has been accessed, the client may work directly with the application. Accordingly, step 222 returns to state 218 wherein the user interface 92 of the service manager 90 is displayed.

In response to receipt of a browser selection at state 218, the browser branch of state 218 may lead to step 224. At step 224, the web server application 54 may be invoked. Next, at step 226, the browser identifier may be provided to access the web server application 54. At step 228, a fire wall identifier for the browser may also be provided. Proceeding to step 230, the fire wall identifier may be validated to allow the browser to access a public network through the fire wall 58. After the web server application 54 has been accessed, the client may work directly with the application. Step 230 returns to state 218 wherein the user interface 92 of the service manager 90 is displayed.

In response to receipt of a file transfer selection at state 218, the file transfer branch of state 218 may lead to step 232. At step 232, the file transfer application 56 may be invoked. Next, at step 234, the file transfer identifier may be provided to access the file transfer application 56. After the file transfer application 56 has been accessed, the client may work directly in the application. Step 234 returns to state 218 wherein the user interface 92 of the service manager 90 is displayed.

In response to a logoff selection at state 218, the logoff branch of state 218 may lead to step 240. At step 240, the client system 14 may logoff of the server system 12. Step 240 leads to the end of the process.

FIG. 6 illustrates a flow diagram of a method of uploading and transmitting a client data file over the network 18 in accordance with one embodiment of the present invention. As previously described, the data file may comprise an electronic data interchange (EDI) file, an electronic funds transfer (EFT) file, and the like. The process begins at step 250 in which the file transfer application 56 receives a recipient address for a data file through the file transfer user interface 122. Next, at step 252, the file transfer application 56 may receive the name of the data file through the user interface 122.

Proceeding to step 254, the data file may be retrieved on the client system 14. At step 256, the file transfer application 56 may upload the data file and the recipient address to the server system 12. Next, at decisional step 258, it is determined if the data file is to be translated. As previously described, preset types of data files between identified training partners may be translated to be compatible with the recipient system. For example, a file may be translated in accordance with a data format required; by a particular trading partner. If the data file is to be translated, the YES branch of decisional step 258 leads to step 260.

At step 260, the translation protocol for the data file is retrieved. Next, at step 262, the translator 66. may translate the data file. Step 262 continues to step 264. Returning to decisional step 258, if the data file is not to be translated, the NO branch of decisional step 258 also leads to step 264.

At step 264, the file transfer application 56 may temporarily hold the data file in the distribution sub-directory 64 of the client directory 60. Proceeding to step 266, the file transfer application 56 may periodically check the distribution sub-directories 64 for files to be: transmitted over the networks 18. In one embodiment, the file transfer application 56 may check the distribution sub-directory 64 every fifteen (15) minutes. It will be understood that file transfer application 56 may otherwise check the distribution sub-directory 64 within the scope of the present invention. Proceeding to step 268, the file transfer application 56 may transmit the data file over the networks 18 to the recipient address. Step 268 leads to the end of the process.

FIG. 7 illustrates a flow diagram of a method of receiving and downloading a data file from a network to a client system in accordance with one embodiment of the present invention. As previously described, the data file may be an electronic data interchange (EDI) file, an electronic funds transfer (EFT) file, and the like. The process begins at step 300 wherein a data file is received over the networks 18. Next, at step 302, the address of the file is also received. Step 302 leads to decisional step 304.

At decisional step 304, the file transfer application 56 may determine if the data file is to be translated. As previously described, preset types of data files between identified trading partners may be translated to be compatible with the recipient's system. If the data files are to be translated, the YES branch of decisional step 304 leads to step 306.

At step 306, a translation protocol for the data file is retrieved. Proceeding to step 308, the translator 66 may translate the data file. Step 308 leads to step 310.

Returning to decisional step 304, if the data file is not to be translated, the NO branch of decisional step 304 also leads to step 310.

At step 310, the file transfer application 56 may temporarily hold the data file in a collection sub-directory 62.

Next, at step 312, the file transfer application 56 may receive a request to download the data file to the client system 14. The request may be an automatic, periodic or manual request from the client.

Next, at step 314, the file transfer application 56 may download a data file from the collection sub-directory 62 to the inbox 124 of the client system 14. Use of the inbox 124 will prevent the file transfer application 56 from overwriting other files or data of the client system 14. At this point the process ends.

Although the present invention has been described with several embodiments, various changes and modifications may be suggested to one skilled in the art. It is intended that the present invention encompass such changes and modifications as fall within the scope of the appended claims.

What is claimed is:

1. A method of providing integrated electronic commerce services, comprising the steps of:
   validating a client system connected to a server system;
   in response to validation of the client system, downloading, from the server system, an electronic mail identifier enabling a service manager of the client system to invoke an electronic mail application, downloading a browser identifier enabling the service manager of the client system to invoke a web server application, and downloading a file transfer identifier enabling the service manager of the client system to invoke a file transfer application to send and receive data over a network;
   generating a random number in the server system; and
   downloading the random number to the client system for future use in validating the client system.

2. The method of claim 1, wherein the file transfer application is operable to send and receive electronic data interchange (EDI) data over the network.

3. The method of claim 1, wherein the file transfer application is operable to send and receive electronic funds transfer (EFT) data over the network.

4. The method of claim 1, further comprising the step of validating access of the client system to a fire wall.

5. The method of claim 1, the step of validating the client system further comprising the steps of:
   uploading a user identifier from the client system to the server system;
   uploading a system identifier from the client system to the server systems
   validating the user identifier; and
   validating the system identifier.

6. The method of claim 5, wherein the user identifier comprises a user ID and a user password.

7. The method of claim 5, wherein the system identifier comprises a software serial number and a random number previously downloaded from the server system.

8. The method of claim 1, further comprising the step of periodically updating the information downloaded to the client system to enable a service manager to invoke the electronic mail application, the web server application, and the file transfer application.

9. The method of claim 1, further comprising the steps of:
   invoking the file transfer application;
   uploading a data file and recipient address from the client system to the server system; and
   transmitting the data file to the recipient address over the network.

10. The method of claim 9, further comprising the step of translating the data file.

11. The method of claim 9, further comprising the steps of:
    storing the uploaded data file and recipient address in a distribution directory of the server system; and
    periodically checking the distribution directory for data files to be transmitted over the network.

12. The method of claim 1, further comprising the steps of:
    invoking the file transfer application;
    receiving a data file and recipient address over the network; and
    downloading the data file from the server system to the client system.

13. The method of claim 12, further comprising the steps of:
    storing the data file in a collection directory of the server system; and
    selectively checking the collection directory for data files to be downloaded from the server system to the client system.

14. The method of claim 1, the step of validating the client system further comprising the steps of:
    uploading from the client system to the server system a random number previously downloaded from the server system in connection with a previous logon session; and
    validating the random number at the server system.

15. An electronic commerce server, comprising:
    an electronic mail application, a web server application, and a file transfer application;
    a server security system operable to validate a client system;
    the server security system operable to download to the valid client system an electronic mail identifier enabling a service manager of the client system to invoke the electronic mail application, a browser identifier enabling the service manager of the client system to invoke the web server application, and a file transfer identifier enabling the service manager of the client system to invoke the file transfer application to send and receive data over a network; and
    the server security system further operable to generate a random number and download the random number to the client system for future use in validating the client system.

16. The server of claim 15, wherein the file transfer application is operable to send and receive electronic data interchange (EDI) data over the network.

17. The server of claim 15, wherein the file transfer application is operable to send and receive electronic funds transfer (EFT) data over the network.

18. The server of claim 15, further comprising a fire wall operable to prevent access to the server through a public network connectable to the server.

19. The server of claim 15, further comprising:
    the file transfer application operable to upload a data file and recipient address from the client system to the server system; and
    the file transfer application operable to transmit the data file to the recipient address over the network.

20. The server of claim 19, further comprising:
    the file transfer application operable to store the uploaded data file and recipient address in a distribution directory of the server system; and the file transfer application operable to periodically check the distribution directory for data files to be transmitted over the network.

21. The server of claim 15, further comprising:

the file transfer application operable to receive a data file and recipient address over the network; and the file transfer application operable to download the data file from the server system to the client system.

22. The server of claim 21, further comprising:

the file transfer application operable to store the data file in a collection directory of the server system; and the file transfer application operable to selectively check the collection directory for data files to be downloaded from the server system to the client system.

23. An integrated electronic commerce system, comprising:

a client system comprising a service manager;

a server system, comprising:

an electronic mail application, a web server application, and a file transfer application;

a server security system operable to validate the client system; the server security system operable to download to the client system an electronic mail identifier enabling a service manager of the client system to invoke the electronic mail application, a browser identifier enabling the service manager of the client system to invoke the web server application, and a file transfer identifier enabling the service manager of the client system to invoke the file transfer application to send and receive data over a network; and the server security system further operable to generate a random number and download the random number to the client system for future use in validating the client system.

24. The system of claim 23, wherein the file transfer application is operable to send and receive electronic data interchange (EDI) data over the network.

25. The system of claim 23, wherein the file transfer application is operable to send and receive electronic funds transfer (EFT) data over the network.

* * * * *